July 24, 1951 L. F. DANIEL 2,561,975
MIXING AND METERING MACHINE FOR POWDERED SUBSTANCES
Filed March 18, 1948 2 Sheets-Sheet 1

Lester F. Daniel
INVENTOR.

BY *Clarence A. O'Brien*
*and Harvey B. Jackson*
Attorneys

Lester F. Daniel
INVENTOR.

Patented July 24, 1951

2,561,975

UNITED STATES PATENT OFFICE 2,561,975

MIXING AND METERING MACHINE FOR POWDERED SUBSTANCES

Lester F. Daniel, Kilgore, Tex., assignor of one-fourth to J. Bruce Synnott, Jr., Beaumont, Tex.

Application March 18, 1948, Serial No. 15,707

1 Claim. (Cl. 222—136)

The present invention relates to new and useful improvements in mixing and metering machines and more particularly to a machine of this character for mixing powdered substances, such as artificial dry mud for use in the drilling of oil or gas wells, or for the mixing of various types of powdered substances for other purposes.

An important object of the invention is to provide a mixing and metering machine including the provision of a plurality of hoppers supported for vibrating movement on a portable frame, each hopper having a discharge spout leading to a mixing spout for the group of hoppers and providing the discharge spouts with regulated orifices to proportion the volume of the material discharged from the respective hoppers.

A further object of the invention is to provide resilient suspension means for the hoppers and vibrating shafts carried by the hoppers to cause an agitation thereof to prevent caking or clogging of the powdered material in the hoppers.

A still further object is to provide an apparatus of this character of simple and practical construction, which is efficient and reliable in operation, which may be easily moved into a working position adjacent a well, and which at the same time is inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
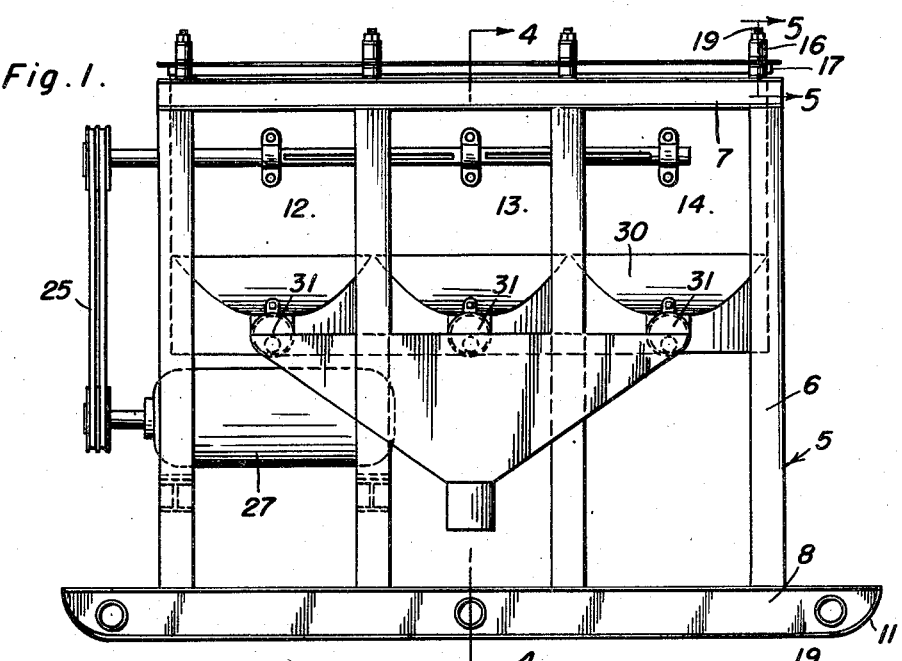
Figure 1 is a side elevational view.
Figure 2:
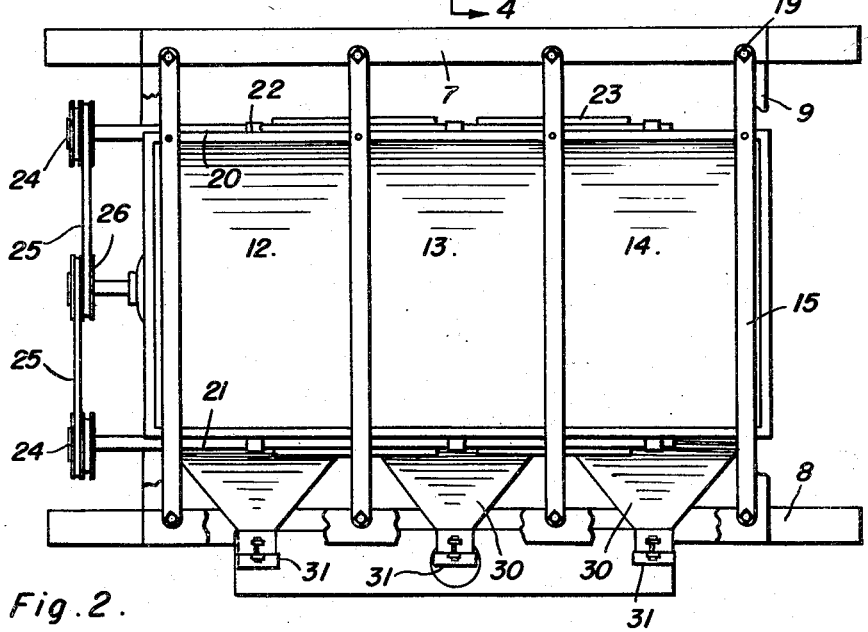
Figure 2 is a top plan view with parts broken away and shown in section.
Figure 3:
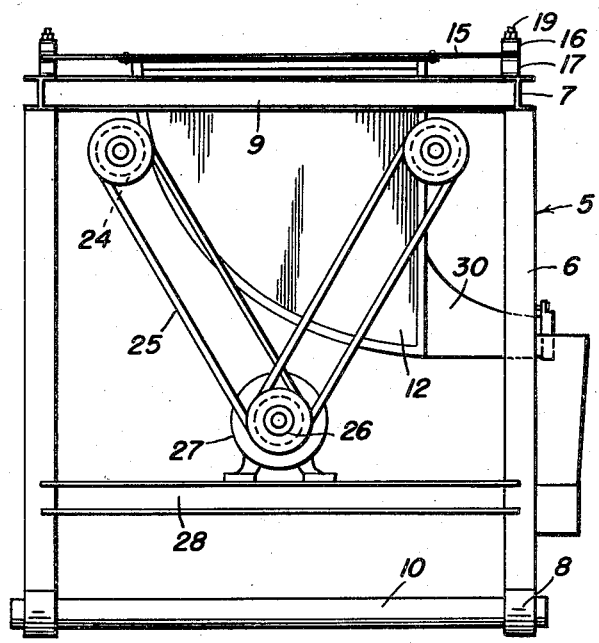
Figure 3 is an end elevational view.
Figure 4:
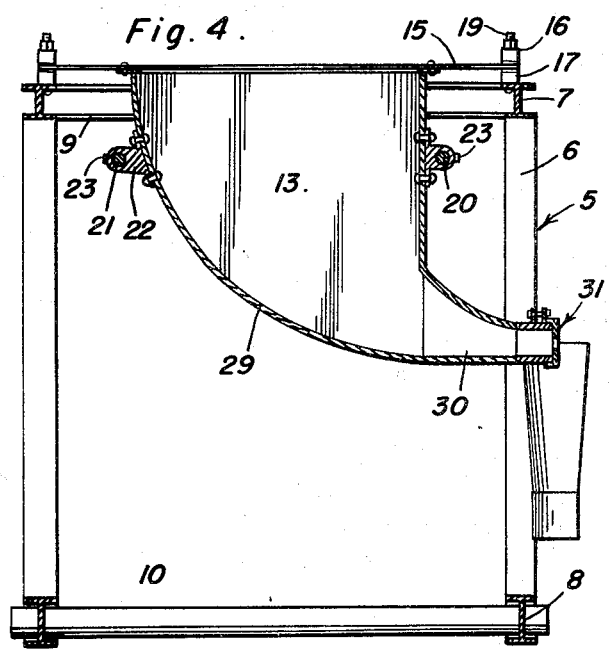
Figure 4 is a transverse sectional view taken substantially on a line 4—4 of Figure 1.
Figure 5:
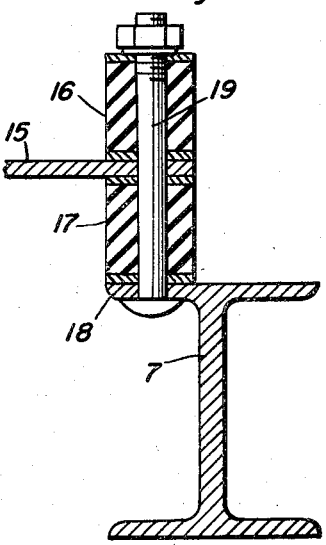
Figure 5 is an enlarged vertical sectional view of one of the shock absorbing supports for the hoppers taken substantially on the line 5—5 of Figure 1.

Referring now to the drawings in detail wherein for the purpose of illustration I have disclosed a preferred embodiment of the invention, the numeral 5 designates generally a supporting frame composed of uprights 6, preferably of tubular construction rigidly connected to each other by upper and lower longitudinal I-beams 7 and 8 and upper transverse I-beams 9 and lower transverse tubular frame members 10. The front and rear ends of the lower longitudinal I-beams 8 are rounded as shown at 11 to provide skids to facilitate dragging of the frame over the ground into a desired location.

A plurality of hoppers 12, 13 and 14 are suitably connected to each other in side-by-side relation and are provided at their upper edges with a plurality of transversely extending spaced parallel metal straps 15 having their end portions secured between upper and lower rubber bumpers or sleeves 16 and 17 supported in an upright position on the upper flange 18 of the I-beams 7 by bolts and nuts or the like 19 whereby to provide a yieldable suspension for the group of hoppers.

A pair of shafts 20 and 21 are journalled in bearings 22 suitably secured to the front and rear of the hoppers in a horizontal position, each shaft 20 and 21 being provided with one or more offset weights 23 extending longitudinally of the shafts to set up vibration, one end of each shaft having a pulley 24 secured thereto driven by belts 25 from a pulley 26 of a power plant 27 supported on a frame or platform 28 suitably secured to the main frame 5.

Each hopper is provided with a forwardly curved bottom 29 leading to a forwardly extending discharge spout 30 having a regulated discharge cap 31 at its outer end.

The cap 31 is threaded on the spout 30 and is formed with a discharge opening 32 positioned at its lower portion and locked against movement by aligned apertured ears 33 and 34 carried by the spout and cap for receiving a locking bolt 35. The cap 31 may be replaced by other caps having openings of different sizes to vary the rate of flow of powder from the several hoppers into a mixing spout 36 supported beneath spouts 30.

In the operation of the device, various types of powdered material is placed in hoppers 12, 13 and 14 and rotation of shafts 20 and 21 will set up a vibration of the hoppers to keep the material flowing continuously from the openings in caps 31 in a predetermined proportion according to the size of the openings.

Having described the invention, what is claimed as new is:

Apparatus for mixing powdered substances in predetermined proportions comprising a supporting frame, a hopper resiliently mounted on the frame, the hopper having a plurality of compartments arranged in side-by-side relation to each other and each of the compartments having a regulated discharge opening, a mixing spout adapted to receive material as discharged from the compartments in predetermined proportions corresponding to the relative sizes of the discharge openings, and means for vibrating the hopper comprising a shaft journaled in bearings mounted on the hopper, the shaft being provided with one or more offset weights to cause vibration thereof, and means for rotating the shaft.

LESTER F. DANIEL.

REFERENCES CITED

The following references are of record in the file of this patent:

UNITED STATES PATENTS

| Number | Name | Date |
|---|---|---|
| 1,197,292 | Hunter | Sept. 5, 1916 |
| 1,705,502 | Schellentrager | Mar. 19, 1929 |
| 1,880,287 | Sifton | Oct. 4, 1932 |
| 2,246,497 | Beck | June 24, 1941 |
| 2,311,373 | Durning | Feb. 16, 1943 |
| 2,346,690 | Larkins | Apr. 18, 1944 |